United States Patent [19]
Rudolph

[11] Patent Number: 5,628,497
[45] Date of Patent: May 13, 1997

[54] LIQUID-FILLED SUPPORT BEARING WITH FLEXIBLE PARTITION WALL

[75] Inventor: Axel Rudolph, Bensheim/Auerbach, Germany

[73] Assignee: Firma Carl Freudenberg, Weinheim, Germany

[21] Appl. No.: 537,339

[22] Filed: May 1, 1995

Related U.S. Application Data

[63] Continuation of Ser. No. 166,590, Dec. 14, 1993, abandoned.

[30] Foreign Application Priority Data

Dec. 14, 1992 [DE] Germany ............ 42 42 080.6

[51] Int. Cl.⁶ .................................................. F16F 13/00
[52] U.S. Cl. .................................. 267/140.12; 267/219
[58] Field of Search .................... 267/140.11, 140.12, 267/140.13, 219, 220; 248/562, 636

[56] References Cited

U.S. PATENT DOCUMENTS

| | | | |
|---|---|---|---|
| 4,568,069 | 2/1986 | Poupard . | |
| 4,717,111 | 1/1988 | Saito . | |
| 4,789,144 | 12/1988 | Brenner | 267/219 |
| 4,838,529 | 6/1989 | Orikawa et al. | 267/140.12 |
| 4,872,650 | 10/1989 | Tabata et al. . | |
| 4,883,260 | 11/1989 | Kanda . | |
| 4,896,868 | 1/1990 | Thelamon et al. . | |
| 4,907,786 | 3/1990 | Okazaki et al. | 267/219 |
| 4,955,589 | 9/1990 | West | 267/140.12 |
| 5,044,813 | 9/1991 | Gregg . | |

FOREIGN PATENT DOCUMENTS

| | | | |
|---|---|---|---|
| 326504 | 8/1984 | European Pat. Off. | 267/140.12 |
| 3831284 | 4/1982 | Germany | 267/140.12 |
| 3820805 | 1/1989 | Germany . | |

*Primary Examiner*—Matthew C. Graham
*Attorney, Agent, or Firm*—Kenyon & Kenyon

[57] ABSTRACT

A liquid-filled bearing having a hydraulic damping device and two fittings which surround one another and are joined by an elastic spring element of elastomer material, there being at least one movable partition wall disposed between two liquid-filled chambers. At least one of the fittings has a gap extending essentially parallel to a moving direction and open in the direction of at least one of the two chambers. The partition wall consists of elastomer material and joins together surfaces defining the gap as the result of a rolling-diaphragm-type profile.

19 Claims, 9 Drawing Sheets

LIQUID-FILLED SUPPORT BEARING WITH FLEXIBLE PARTITION WALL

This application is a continuation of U.S. patent application Ser. No. 08/166,590, filed on Dec. 14, 1993 now abandoned.

FIELD OF THE INVENTION

The invention relates generally to a support bearing and more particularly to a liquid-filled support bearing having a hydraulic damping device and two fittings The support bearing may be used, for example, as a support for the engine of an automobile.

BACKGROUND OF THE INVENTION

Such a bearing is disclosed by German Unexamined Patent Application 38 20 805. The two fittings are made up of an inner and an outer cylinder, there being essentially three hollow spaces provided on both sides of the inner cylinder in the direction in which vibrations are introduced. One of the hollow spaces, which is adjacent to the inner cylinder, is liquid-filled. It is subdivided into a working chamber and a compensation chamber by means of a partition wall, which consists of inflexible material and is suspended in a way that allows it to vibrate. The working chamber and the compensation chamber are in fluid communication with one another, the working chamber being bounded by the elastic spring element and the compensation chamber by a bellows-type membrane. It is worth noting, however, that the bearing consists of a plurality of individual parts and, as a result, is not very satisfactory from a standpoint of economics and production engineering. Moreover, the massive form of the partition wall makes it problematic to isolate higher-frequency vibrations.

SUMMARY AND ADVANTAGES OF THE INVENTION

An object of the invention is to provide a bearing so as to produce a considerably simplified structure and better working properties with respect to isolating or damping vibrations lying within at least two frequency ranges.

Another object of the invention is to provide a bearing which is able to be adapted quite easily to the particular conditions of the application case.

The present invention therefore provides a liquid-filled bearing which provides damping of vibrations caused by movement in a moving direction comprising: an inner fitting; an outer fitting surrounding the inner fitting and spaced apart from the inner fitting, at least one fitting having a gap extending essentially parallel to the moving direction; an elastic spring element of elastomer material connecting the inner fitting and the outer fitting so as to form at least two chambers, the chambers being filled with liquid, the gap being open to at least one chamber; and at least one movable partition wall disposed in said gap in a rolling diaphragm-type profile.

Therefore, it is provided for at least one fitting to have a gap extending essentially parallel to the direction of movement and open in the direction of at least one of the two chambers and for the partition wall to consist of elastomer material and to join together the surfaces defining the gap in the area of the wall extremities as the result of a rolling-diaphragm-type profile. The profile preferably has an S-shaped design.

The advantageous refinement of the partition wall makes it possible for this wall to be adapted quite favorably to the particular conditions of the application case. The length of the gap can be selected essentially independent of the shape of the fittings and extend virtually within the entire extent of the outer fitting. Because of its simple structure, the bearing can be produced inexpensively and adapted to any application case at all, for example, simply by exchanging the fitting that is provided with the gap. Because of the way the partition wall is arranged inside the gap, it is only able to move at essentially right angles to the moving direction of the introduced vibrations. In conjunction with the S-shaped profile and the fixing to the surfaces defining the gap, this leads to an especially low-noise operation of the bearing. When higher-frequency, small-amplitude vibrations are introduced, the partition wall vibrates freely between the adjacent surfaces, without coming in contact with them in the area between their extremities. When low-frequency, large-amplitude vibrations are damped, the partition wall comes to rest against one of the surfaces, section by section and also gradually, in dependence upon which of the two chambers has the comparatively higher pressure. To minimize impact noises, the partition wall can be at least partially contoured in the area of its top surfaces. In the same way, the adjacent surfaces can be additionally or alternatively contoured. This effect is enhanced further, because the surfaces defining the gap preferably do not run parallel to the top surface of the partition wall. This refinement makes it possible to reliably rule out any cavitation in the vicinity of the gap. In accordance with one advantageous refinement, at least one limit stop can be configured next to the partition wall to restrict deflection movements.

According to one advantageous refinement, the partition wall and the elastic spring element can be designed to blend into one another in one piece. This refinement further simplifies the manufacturing of the bearing.

With respect to attaining a further damping maximum and, thus, broader damping, two gaps and two partition walls can be provided within the bearing. The two partition walls are preferably distinguished from one another by differing inertial masses and/or spring constants. For example, one of the partition walls can be designed to be comparatively thin-walled with respect to insulating higher-frequency vibrations and, as a result, have a smaller inertial mass. Because the wall would then be able to be easily shifted back and forth when high-frequency vibrations are introduced, such relative movements executed by this separation wall can be compensated. When such vibrations are introduced, virtually no pressure changes occur within the adjacent chambers, so that the introduced vibrations cannot be transmitted to the attached component part.

To damp low-frequency vibrations, the two chambers can be in fluid communication with one another through a restrictor duct that functions as the damping device. The length and the cross-section of the restrictor duct is preferably adjusted so as to allow vibrations within the frequency range of 5 to 15 Hz to be damped as the result of a resonant vibration of the liquid column inside the damping duct.

The simple design of the bearing can be enhanced by having the restrictor duct be delimited by an outer plate bearing the rubber member and by an outer pot surrounding the outer plate. In this case, the outer fitting is designed as an outer pot.

The following explanations pertain to the functioning of the bearing:

When low-frequency, large-amplitude vibrations are introduced in the range of 5 to 15 Hz, the partition wall comes to rest gradually and section by section, with its top surface, which is arranged in the lower-pressure chamber, against the adjacent surface of the fitting defining the gap. When the partition wall comes to rest against the surface, a hardening of the bearing sets in. The low-frequency vibrations are damped by way of the restrictor duct interconnecting the two liquid-filled chambers. Comparatively higher-frequency vibrations, for example in the range of 15 to 100 Hz, are insulated as a result of the capability of the partition wall to move freely back and forth between the stop faces and as a result of the opposite-phase vibrations of the liquid components in the gap area. These effects improve for example the idling performance of motor vehicles when the bearing supports an automobile engine. When at least one additional gap with a partition wall arranged therein is employed, additional damping maxima can be achieved. These can be adapted quite favorably to the particular conditions of the application case due to the mobility of the partition wall and the refinement of the gap.

A stop buffer that projects into at least one chamber in the moving direction of the vibrations can be provided on at least one of the fittings, the stop buffer being preferably provided with a protective rubber layer that is designed in one piece with the elastic spring element. With respect to an improved service life, it is possible for the protective rubber layer to be provided in the area of its stop faces with a comparatively inflexibly designed reinforcement. Extreme deflections, which are restricted by the stop buffer, do not cause the elastic spring element to be overstretched. The protective rubber layer between the stop faces of the two fittings can be provided, if needed, with at least one depression, in order to effect, in this manner, a limit-position damping with further minimization of generated noise.

The moving direction and the gap preferably form an angle of less than 20°. The rolling-diaphragm-type partition wall and its arrangement parallel to the moving direction of the introduced vibrations prevent instances of fluid vorticity inside the bearing as in the case of limit-stop contact between the partition wall and the adjacent surfaces. The bearing is sealed off in a fluid-tight manner at its front extremities from the environment, and delimited by moldable, rubber-elastic front walls, which are likewise designed in one piece with the elastic spring element. The front walls are preferably shaped so as not to permit any significant tensile stresses, even when the inner fitting experiences extreme deflections relative to the outer fitting. As a result, the advantageous working properties can be retained over a long service life.

BRIEF DESCRIPTION OF THE DRAWINGS

The subject matter of the invention will be described further with reference to the following drawings.

DETAILED DESCRIPTION

The bearings 1 depicted in FIGS. 1–9 comprise two fittings 3, 4, which surround one another and are braced against one another by means of an elastic spring element 5 of elastomer material. The fittings 3, 4 consist in these exemplified embodiments of a metallic material, whereby in each of the exemplified embodiments, the inner fitting 3 has a longitudinal bore hole 22 and at least one gap 12, a partition wall 11 being arranged inside the gap 12. In these exemplified embodiments, the partition wall 11 is designed to blend in one piece with the elastic spring element 5 and also with a protective rubber layer 21 of a stop buffer 20 of inner fitting 3. The partition wall 11 connects with the elastic spring element at extremities 15, 16. The inner fitting 3 has limit stops 9, 10 configured next to the partition wall to restrict deflection movements of the partition wall 11. Two liquid-filled chambers 7, 8 are in fluid communication with one another by way of a restrictor duct 17, which is designed as a damping device 2. The elastic spring element 5 is affixed to an outer plate 18, which is designed as an end-window tube and is made of a metallic material. The outer plate 18 is supported so as to render it immovable and liquid-tight in the outer fitting 4. The inner and the outer fittings 3, 4 are designed to be assembled with parts of a machine, i.e., with the chassis and the body of a motor vehicle. The elastic spring element 5 is joined, on the one hand, by means of direct prevulcanization, to the inner fitting 3 and, on the other hand, to the outer plate 18. The outer plate 18 is surrounded by outer pot 19 of the outer fitting 4. In a moving direction 6 of the introduced vibrations, the inner fitting 3 is provided on both sides of longitudinal bore hole 22 with stop buffers 20, which project in the direction of the chambers 7, 8 and are each provided with protective layer 21 of rubber elastic material, which is designed in one piece with the elastic spring element 5. When vibrations of a larger amplitude are introduced which require damping, the partition walls 11 of the bearings depicted here come at least partially in contact with the surfaces 13, 14 delimiting the gap 12 and, as a result, effect a hardening of the bearing. When the partition walls 11 come at least partially to rest against the surfaces 13, 14, liquid components are pressed through the restrictor duct 17 into that chamber 7, 8 in which the comparatively lower pressure prevails. This results in an excellent damping effect. This damping effect can be based on the utilization of the restrictor or on absorption effects, in dependence upon the particular formation of the damping opening. The prerequisites for making such adjustments are known to one skilled in the art and are not a subject of the present invention.

When the two fittings 3, 4 experience extreme deflections in relation to one another, the stop buffers 20 can strike with their rubber-elastic protective layer 21 against the adjacent inner side of the outer fitting 4. The elastic flexibility of the protective layer 21 largely prevents unwanted impact noises from occurring.

Figure 1:
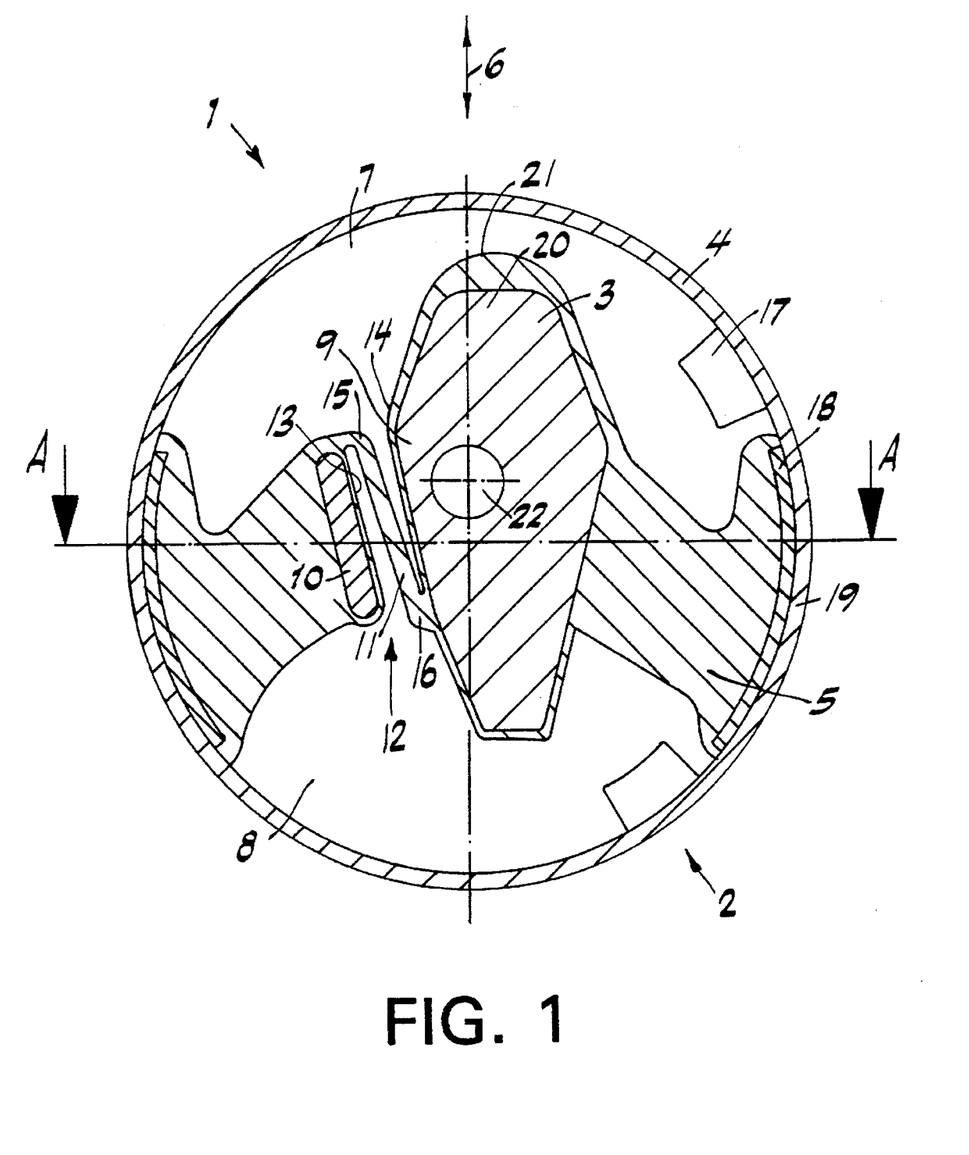
FIG. 1 shows a support bearing in a cross-sectional representation.

In FIG. 1, the partition wall 11 only extends within the gap 12, which is delimited by the surfaces 13, 14 of the inner fitting. An advantage here is that undesired, substantial deformations of the partition wall 11 are reliably prevented, even when impact stresses and resulting pressure peaks occur inside the chambers 7, 8. In dependence upon the particular conditions of the application case, one can provide for a reinforcement inside the partition wall. This is generally superfluous, however, in the case of a refinement in accordance with FIG. 1.

Figure 2:
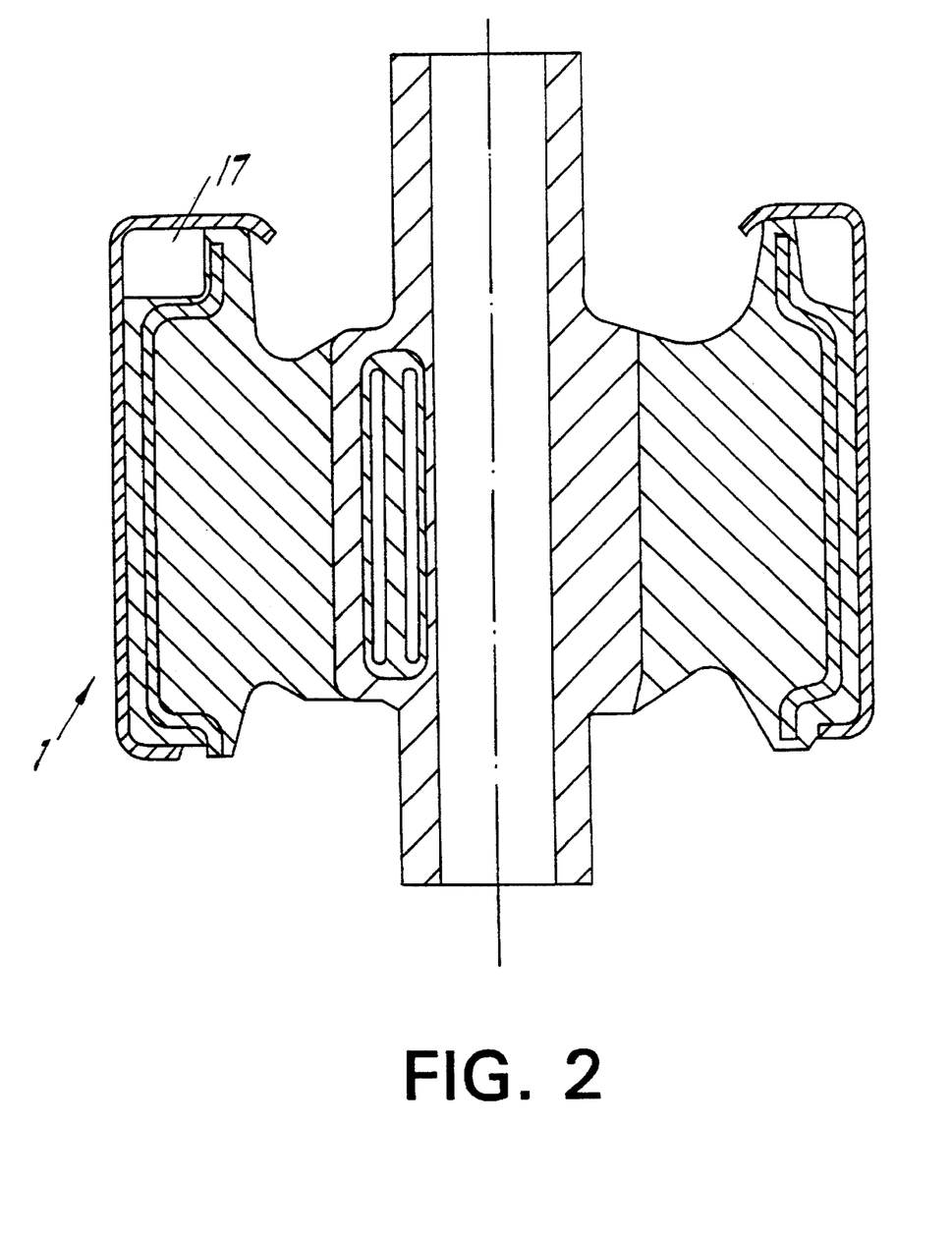
FIG. 2 shows a longitudinal cross-section through a support bearing similar in most respects to the bearing of FIG. 1 and approximately in accordance with the line of intersection A—A.

FIG. 2 shows a longitudinal section through a bearing 1 essentially similar to that of FIG. 1 along the section A—A. As proceeds from this drawing, the restrictor duct 17 has an annular shape and extends along the outer periphery of the bearing 1.

Figure 3:
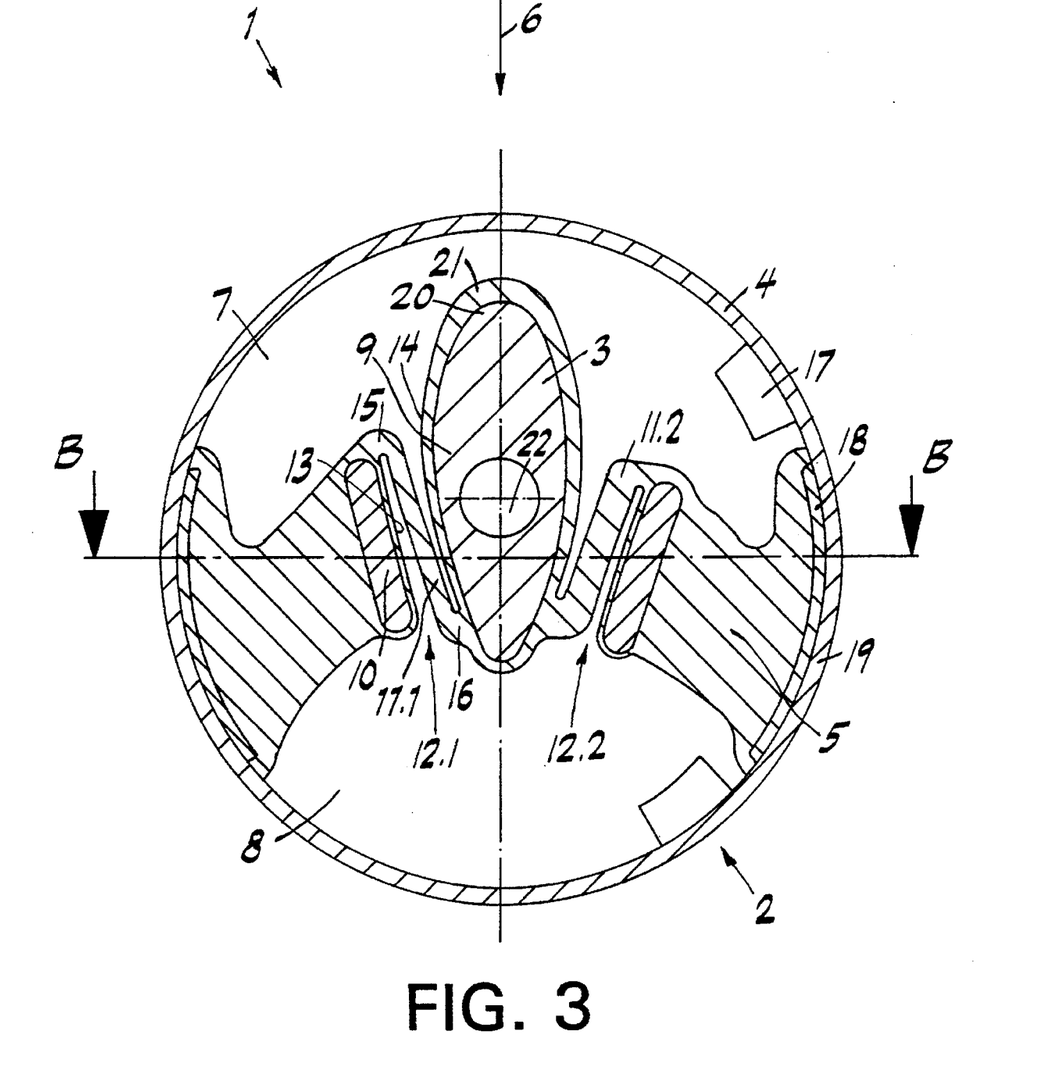
FIG. 3 shows a cross-sectional representation of another embodiment of a support bearing, similar to the exemplified embodiment of FIG. 1, in which two gaps, each having a partition wall, are provided inside the inner fitting.

In FIG. 3, a bearing 1 is shown whose design is similar to that of the bearing 1 of FIG. 1. To attain a further damping maximum, however, an additional gap 12.2 is provided in this exemplified embodiment. This gap 12.2 is likewise arranged inside the inner fitting 3, the two gaps 12.1, 12.2 having essentially a symmetrical design. The function of the partition wall 11.1 inside the gap 12.1 corresponds to the function of the two parts of FIG. 1, while a second partition wall 11.2 inside the second gap 12.2 exhibits a relatively increased material strength and, as a result, a greater inertial mass and spring constant. To damp low-frequency vibrations in the range of, for example, 10 Hz, both of the two partition walls 11.1, 11.2 are positioned against one surface each of the gaps 12.1, 12.2, in dependence upon the pressure difference prevailing between the two chambers 7, 8.

Fluid is exchanged between the two neighboring chambers 7,8 through the restrictor duct 17. This refinement makes it possible for comparatively higher-frequency vibrations within a broad frequency range to be damped/insulated.

Figure 4:
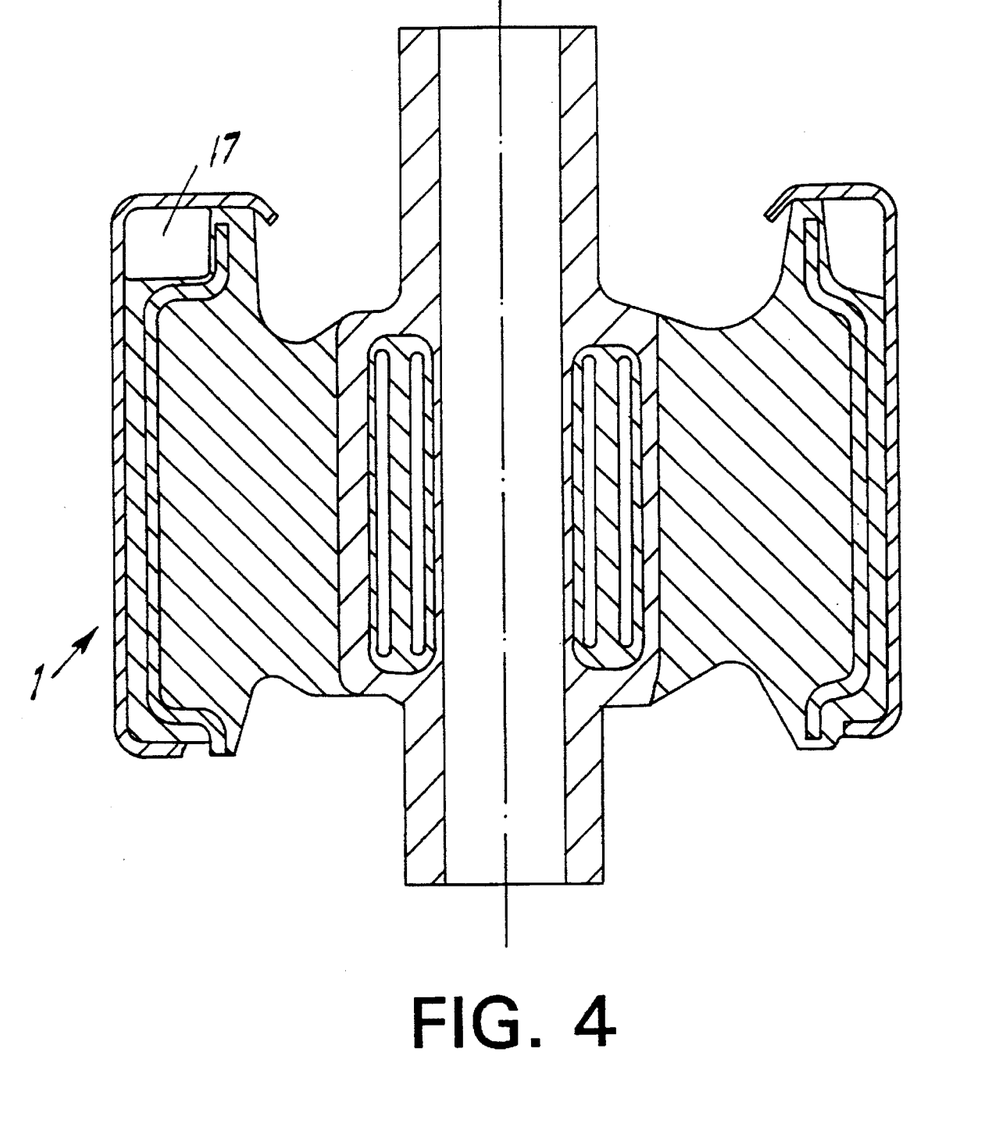
FIG. 4 shows a longitudinal cross-section through a support bearing similar in most respects to the bearing of FIG. 3 and approximately in accordance with the line of intersection A—A.

In FIG. 4, a bearing 1 essentially similar to that of FIG. 3 is depicted in a longitudinal section approximately along the line B—B.

Figure 5:
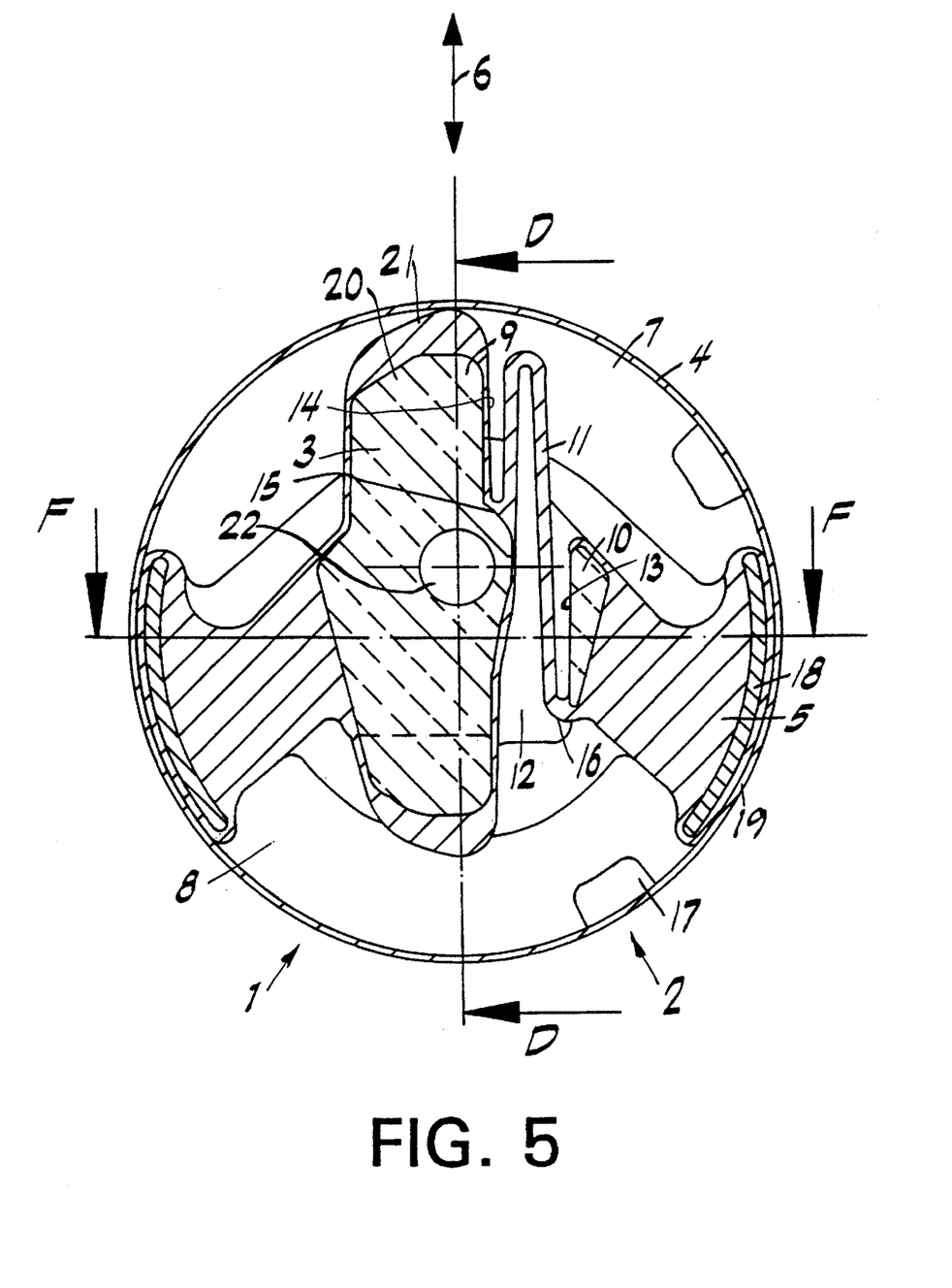
FIG. 5 shows a third exemplified embodiment, in which the partition wall is only partially arranged inside the surfaces delimiting the gap.

FIG. 5 illustrates another exemplified embodiment of a bearing, in which the partition wall 11 is able to be positioned against the surfaces 13, 14 of the gap 12 in one partial section only. The advantage of the bearing according to the invention can be seen in its universal applicability. When the external dimensions remain unchanged, the working properties can be advantageously influenced by varying the refinement of the inner fitting 3 with the gap 12 provided therein and the partition wall 11. In this exemplified embodiment, the partition wall 11 can be reinforced, particularly in the transition region where it emerges from the gap 12 of the inner fitting 3, to avoid the unacceptably large deformations that can occur when it is subjected to pressure peaks. Diverging from this refinement, the shape of the membrane can be varied to such an extent and, for example, shortened in length, so that a nearly U-shaped profile will result from the essentially S-shaped profile. Besides a change in the length, deviations in the flexural stiffness of the partition wall 11 can advantageously influence the working properties of the bearing.

Figure 6:
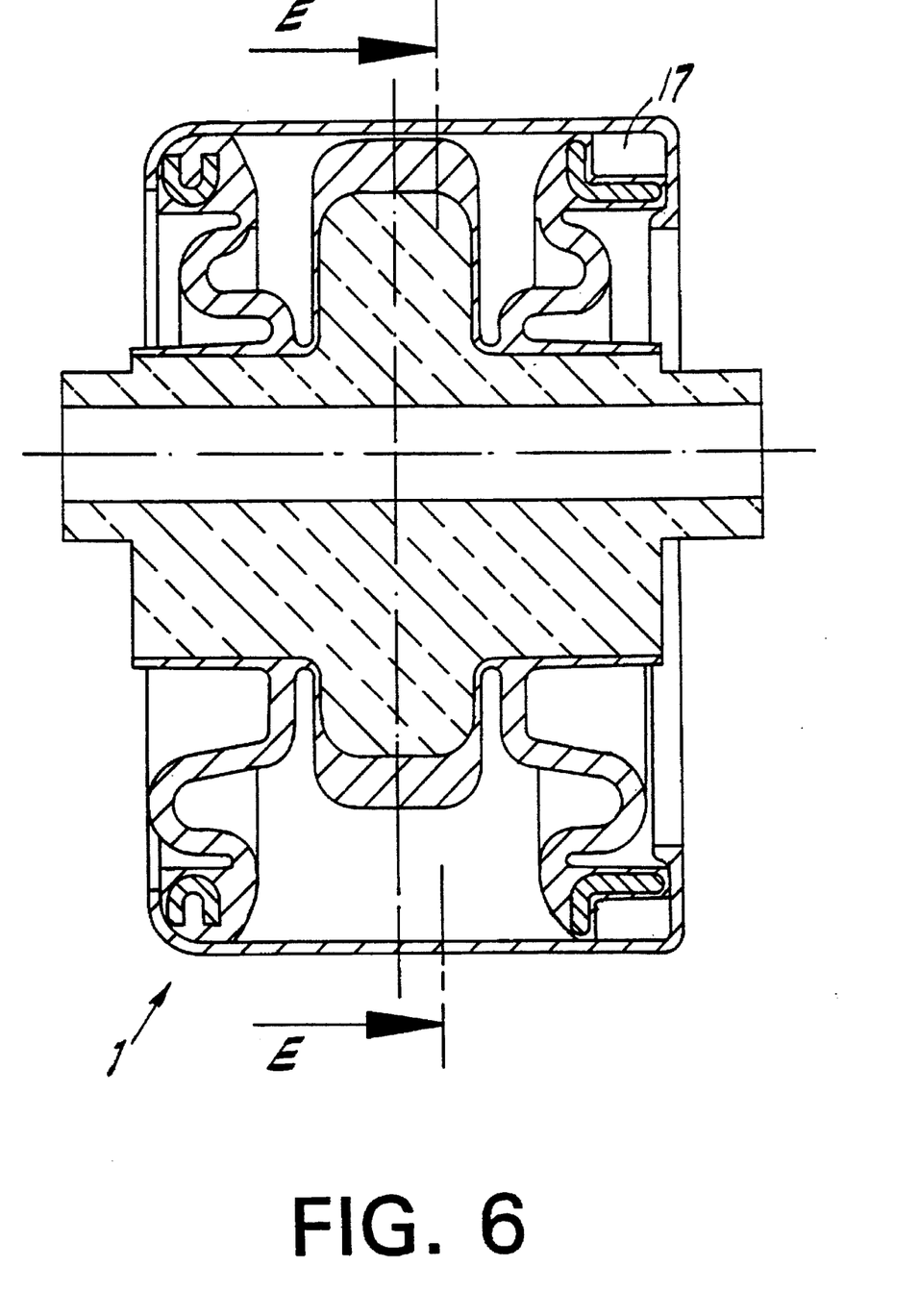
FIG. 6 shows the bearing of FIG. 5 in a representation in longitudinal section approximately along the line D—D.

In FIG. 6, the bearing depicted in FIG. 5 is shown in a representation in longitudinal section along the line of intersection D—D.

Figure 7:
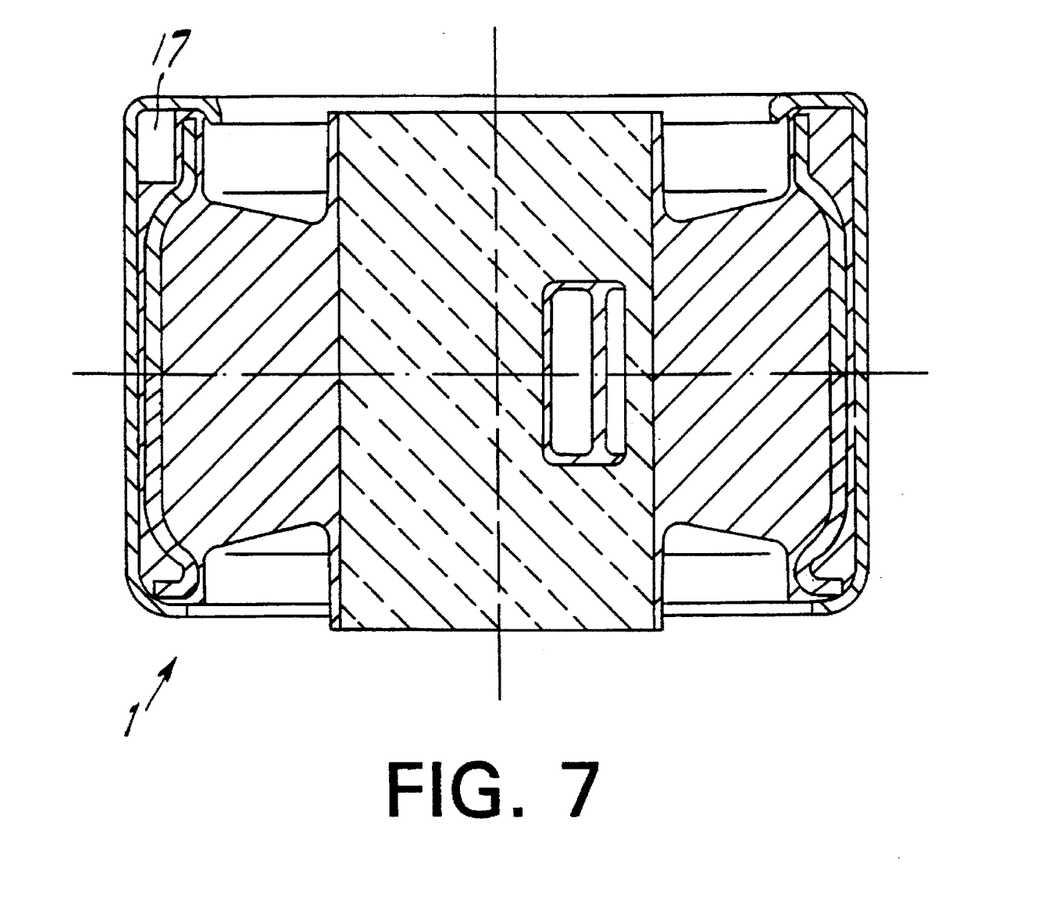
FIG. 7 shows the bearing of FIG. 5 in a cut-off representation along the line F—F.

FIG. 7 depicts the bearing of FIG. 5 along the section F—F. One can recognize the one-piece inner fitting with its gap, and the partition wall arranged inside the gap.

Figure 8:
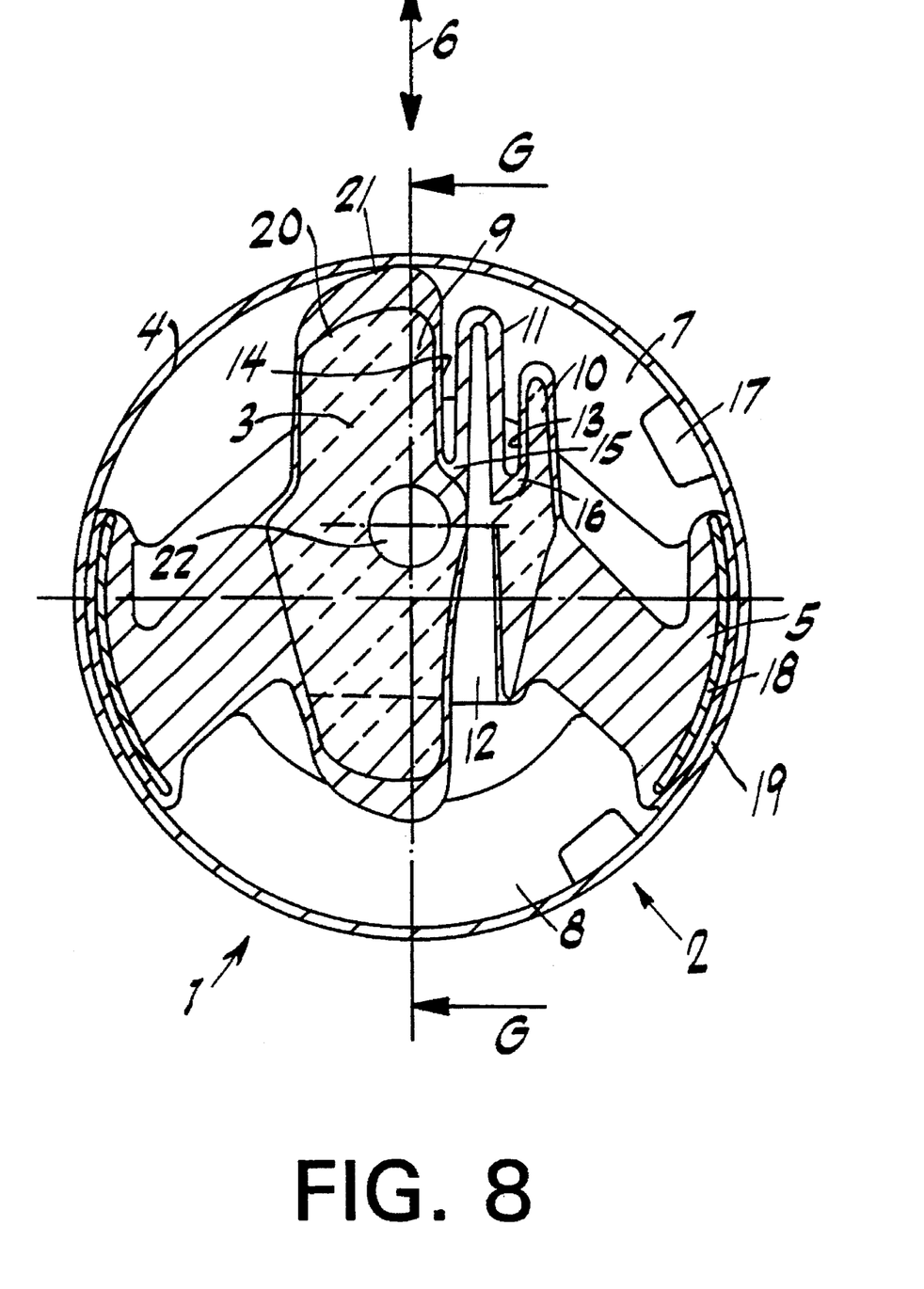
FIG. 8 shows a further exemplified embodiment, similar to the embodiment of FIG. 5 in which the inner fitting has a modified stop face.

FIG. 8 depicts a fourth exemplified embodiment of the bearing according to the invention, in which the inner fitting 3 exhibits the duct-type gap 12, which is sealed off by the partition wall 11 in the direction of the chamber 7. The surfaces 13, 14, which are provided as stop faces, extend on both sides along the essentially U-shaped partition wall 11 and are allocated to adjoin this wall with clearance. In this exemplified embodiment, the surfaces 13, 14 and the partition wall 11 are profiled over their entire surface area to reliably rule out impact noises and cavitation during operation of the bearing.

Figure 9:
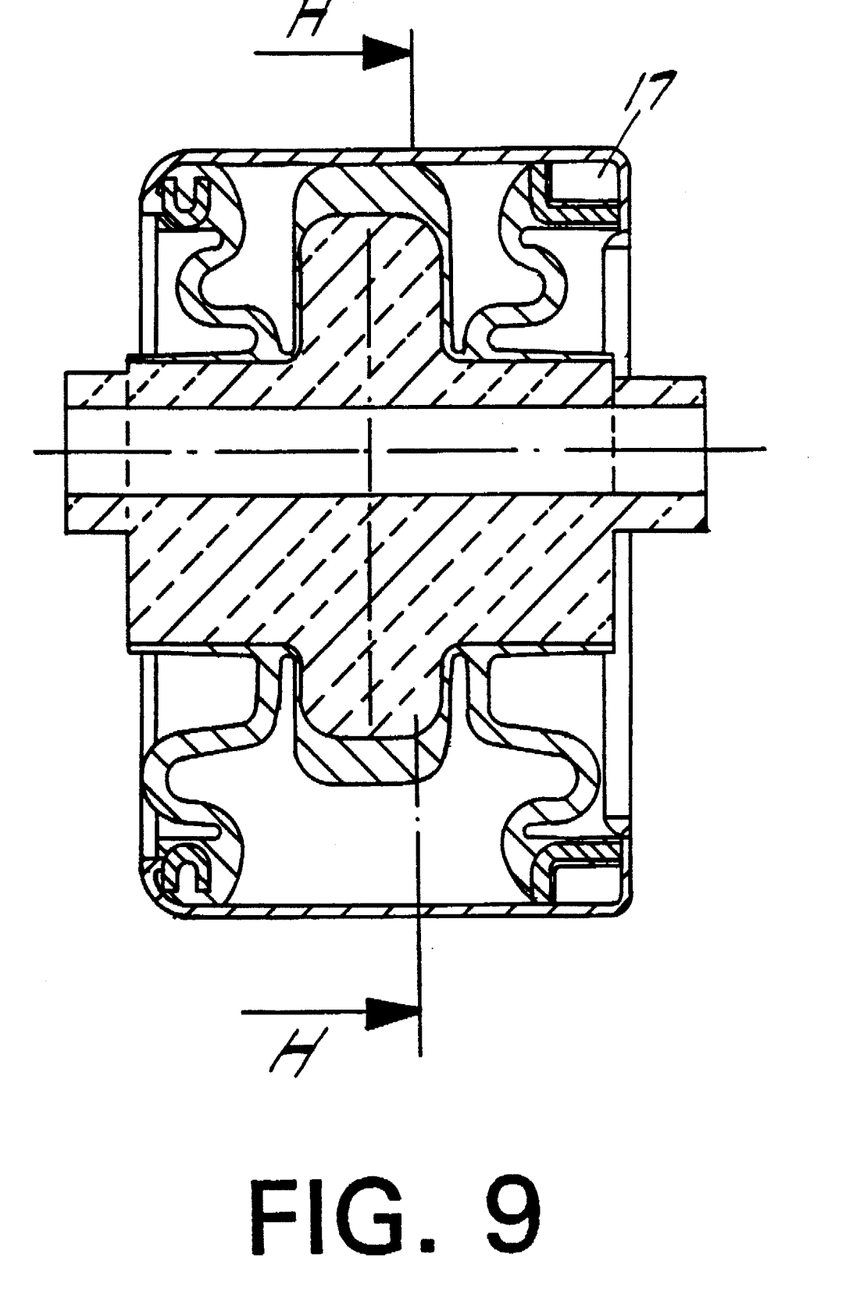
FIG. 9 shows the bearing of FIGS. 8 in a representation in longitudinal section along the line G—G.

FIG. 9 illustrates the bearing of FIG. 8 along the section G—G.

The bearings 1 according to the exemplified embodiments 1 through 9 are each shown in a non-installed state that is conditional upon manufacturing. In relationship to the outer fitting 4, the longitudinal bore hole 22 exhibits an eccentricity, which can be reduced or completely eliminated after installation through the application of a static preload.

While the present invention has been disclosed with respect to the above-described embodiments, it is contemplated that other embodiments may fall within the scope of the present invention.

What is claimed is:

1. A liquid-filled bearing for damping vibrations caused by movement in a moving direction, said liquid-filled bearing comprising:
   an inner fitting;
   an outer fitting surrounding said inner fitting and spaced apart from said inner fitting;
   an elastic spring element of elastomer material connecting said inner fitting and said outer fitting and dividing an area between said inner fitting and said outer fitting so as to form at least two chambers, said chambers being filled with liquid;
   a gap extending within at least one of said inner and outer fittings, said gap extending between said chambers in a gap extension direction substantially parallel to the moving direction; and
   at least one partition wall disposed in said gap in a rolling diaphragm-type profile, said partition wall being movable in a partition wall displacement direction;
   wherein said partition wall displacement direction is substantially perpendicular to said gap extension direction.

2. The bearing as recited in claim 1 wherein at least one fitting has at least one limit stop configured next to the partition wall to restrict deflection movements of the partition wall.

3. The bearing as recited in claim 1 wherein the partition wall and the elastic spring element are integrally connected.

4. The bearing as recited in claim 1 further comprising a damping device.

5. The bearing as recited in claim 4 wherein the damping device comprises a restrictor duct connecting at least two chambers.

6. The bearing as recited in claim 5 further comprising an outer plate which delimits the restrictor duct and is connected to the elastic spring element; and wherein the outer fitting comprises an outer pot surrounding the outer plate.

7. The bearing as recited in claim 1 wherein at least one fitting has a stop buffer that projects into at least one chamber in the moving direction, the stop buffer being provided with a protective layer of rubber elastic integral with the elastic spring element.

8. The bearing as recited in claim 1 wherein the moving direction and the gap extension direction form an angle of less that 20°.

9. The bearing as recited in claim 1 wherein the partition wall is essentially S-shaped.

10. A liquid-filled bearing for damping vibrations caused by movement in a moving direction, said liquid-filled bearing comprising:

an inner fitting;

an outer fitting surrounding said inner fitting and spaced apart from said inner fitting;

an elastic spring element of elastomer material connecting said inner fitting and said outer fitting and dividing an area between said inner fitting and said outer fitting so as to form at least two chambers, said chambers being filled with liquid;

at least two gaps extending within at least one of said inner and outer fittings, said gaps extending between said chambers in gap extension directions substantially parallel to the moving direction; and at least two partition walls, with a partition wall disposed in each of said gaps in a rolling diaphragm-type profile, said partition walls being movable in partition wall displacement directions;

wherein said partition wall displacement directions are substantially perpendicular to said gap extension directions.

11. The bearing as recited in claim 10 wherein each partition wall has a different spring constant.

12. The bearing as recited in claim 10 wherein at least one fitting has at least one limit stop configured next to each partition wall to restrict deflection movements of the partition wall.

13. The bearing as recited in claim 10 wherein each partition wall and the elastic spring element are integrally connected.

14. The bearing as recited in claim 10 further comprising a damping device.

15. The bearing as recited in claim 14 wherein the damping device comprises a restrictor duct connecting at least two chambers.

16. The bearing as recited in claim 15 further comprising an outer plate which delimits the restrictor duct and is connected to the elastic spring element; and wherein the outer fitting comprises an outer pot surrounding the outer plate.

17. The bearing as recited in claim 10 wherein at least one fitting has a stop buffer that projects into at least one chamber in the moving direction, the stop buffer being provided with a protective layer of rubber elastic integral with the elastic spring element.

18. The bearing as recited in claim 10 wherein the moving direction and each gap extension direction form an angle of less that 20°.

19. The bearing as recited in claim 10 wherein the partition wall is essentially S-shaped.

* * * * *